US010566661B2

(12) United States Patent
Shimanuki et al.

(10) Patent No.: US 10,566,661 B2
(45) Date of Patent: Feb. 18, 2020

(54) ELECTROLYTIC SOLUTION AND SECONDARY BATTERY

(71) Applicant: NEC Corporation, Tokyo (JP)

(72) Inventors: Ikiko Shimanuki, Tokyo (JP); Hitoshi Ishikawa, Tokyo (JP); Noboru Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 442 days.

(21) Appl. No.: 15/319,341

(22) PCT Filed: Jun. 16, 2015

(86) PCT No.: PCT/JP2015/067331
§ 371 (c)(1),
(2) Date: Dec. 15, 2016

(87) PCT Pub. No.: WO2015/194559
PCT Pub. Date: Dec. 23, 2015

(65) Prior Publication Data
US 2017/0141440 A1 May 18, 2017

(30) Foreign Application Priority Data
Jun. 16, 2014 (JP) .................................. 2014-123653

(51) Int. Cl.
*H01M 10/42* (2006.01)
*H01M 10/0567* (2010.01)
(Continued)

(52) U.S. Cl.
CPC ....... *H01M 10/4235* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 2005/0170257 A1 | 8/2005 | Kim et al. |
| 2007/0015062 A1* | 1/2007 | Lee .................. H01M 4/13 |
| | | 429/329 |

(Continued)

FOREIGN PATENT DOCUMENTS

| CN | 101213702 A | 7/2008 |
| CN | 102742063 A | 10/2012 |

(Continued)

OTHER PUBLICATIONS

Notification of First Office Action dated Sep. 4, 2018, issued by The State Intellectual Property Office of the People's Republic of China (CPO) in counterpart, Chinese Patent Application No. 201580032155.6.

Office Action dated Dec. 17, 2019, issued by Japanese Patent Office in counterpart Japanese Patent Application No. 2016-529378.

(Continued)

*Primary Examiner* — Wyatt P McConnell
(74) *Attorney, Agent, or Firm* — Finnegan, Henderson, Farabow, Garrett & Dunner, L.L.P.

(57) ABSTRACT

The present invention relates to an electrolytic solution comprising a cyclic disulfonic acid ester represented by the specific formula and a cyclic dicarboxylic acid ester represented by the specific formula, and the secondary battery using the same. According to the present invention, the electrolytic solution which can improve a cycle characteristics in a secondary battery and a secondary battery using the same can be provided.

14 Claims, 2 Drawing Sheets

(51) Int. Cl.
  *H01M 10/0568* (2010.01)
  *H01M 10/0569* (2010.01)
  *H01M 4/505* (2010.01)
  *H01M 4/525* (2010.01)
  *H01M 4/587* (2010.01)
  *H01M 10/0525* (2010.01)

(52) U.S. Cl.
  CPC ....... *H01M 4/587* (2013.01); *H01M 10/0525* (2013.01); *H01M 10/0567* (2013.01); *H01M 10/0568* (2013.01); *H01M 10/0569* (2013.01); *H01M 2300/0037* (2013.01)

(56) References Cited

U.S. PATENT DOCUMENTS

| | | |
|---|---|---|
| 2009/0239154 A1 | 9/2009 | Lee et al. |
| 2011/0159378 A1 | 6/2011 | Lee et al. |
| 2013/0029218 A1* | 1/2013 | Waki .................. H01M 4/587 429/200 |

FOREIGN PATENT DOCUMENTS

| | | |
|---|---|---|
| CN | 103441302 A | 12/2013 |
| JP | 2002-75439 | 3/2002 |
| JP | 2004-281368 | 10/2004 |
| JP | 2005-222947 | 8/2005 |
| JP | 2005-317403 A | 11/2005 |
| JP | 2005-322610 | 11/2005 |
| JP | 2008-41635 | 2/2008 |
| JP | 2010-501982 | 1/2010 |
| JP | 2010-34087 | 2/2010 |
| JP | 2013-175454 | 9/2013 |
| WO | WO 2007/004813 A1 | 1/2007 |
| WO | WO 2011/096572 | 8/2011 |
| WO | WO 2013/005502 A1 | 1/2013 |
| WO | WO 2013/137351 A1 | 9/2013 |
| WO | WO 2014/087922 A1 | 6/2014 |
| WO | WO 2014/157533 A1 | 10/2014 |

OTHER PUBLICATIONS

International Search Report and Written Opinion dated Sep. 29, 2015, in corresponding PCT International Application.

* cited by examiner

ELECTROLYTIC SOLUTION AND SECONDARY BATTERY

CROSS-REFERENCE TO RELATED PATENT APPLICATIONS

This application is a National Stage Entry of International Application No. PCT/JP2015/067331, filed Jun. 16, 2015, which claims priority from Japanese Patent Application No. 2014-123653, filed Jun. 16, 2014. The entire contents of the above-referenced applications are expressly incorporated herein by reference.

TECHNICAL FIELD

The present invention relates to an electrolytic solution and a secondary battery comprising the electrolytic solution. Particularly, by using a specific nonaqueous electrolytic solution, a lithium ion secondary battery having excellent cycle characteristics is provided.

BACKGROUND ART

With the rapid expansion of markets for notebook computers, cellular phones, electric vehicles, and the like, secondary batteries having excellent performance are required, and electrolytic solutions comprising various additives in order to improve the performance of secondary batteries are developed.

For example, Patent Literature 1 discloses an electrolytic solution for a secondary battery comprising an aprotic solvent and a cyclic sulfonic acid ester having at least two sulfonyl groups.

Patent Literature 2 discloses a nonaqueous electrolyte composition comprising a supporting salt, a nonaqueous solvent, a phosphate ester, and a compound having a sulfone structure.

Patent Literature 3 discloses an electrolytic solution comprising a solvent, a supporting salt, and at least one of sulfone compounds represented by predetermined formulas.

Patent Literature 4 discloses an electrolytic solution comprising a six-membered ring to nine-membered ring cyclic organic compound having at least one oxycarbonyl group.

Patent Literature 5 discloses an electrolytic solution comprising an open-chain branched dicarboxylic acid ester represented by a predetermined formula.

CITATION LIST

Patent Literature

Patent Literature 1: Japanese Patent Laid-Open No. 2004-281368
Patent Literature 2: Japanese Patent Laid-Open No. 2008-041635
Patent Literature 3: Japanese Patent Laid-Open No. 2010-034087
Patent Literature 4: Japanese Patent Laid-Open No. 2005-222947
Patent Literature 5: Japanese Patent Laid-Open No. 2002-075439

SUMMARY OF INVENTION

Technical Problem

As disclosed in Patent Literatures 1 to 5, electrolytic solutions containing various additives for the purpose of the improvement of the performance of secondary batteries are disclosed, but sufficient battery characteristics have not yet been obtained. The invention of the present application has been made in view of the circumstances as described above, and it is an object of the invention of the present application to provide a lithium secondary battery having excellent cycle life.

Solution to Problem

The present invention relates to an electrolytic solution for a secondary battery comprising:
a nonaqueous solvent,
a compound represented by the following formula (1), and
at least one compound selected from the group consisting of a compound represented by the following formula (2) and a compound represented by the following formula (3); and
a secondary battery comprising the electrolytic solution.

wherein in the formula (1),
Q represents an oxygen atom, methylene group, or a single bond;
A represents substituted or unsubstituted alkylene group having 1 to 5 carbon atoms, carbonyl group, sulfinyl group, substituted or unsubstituted fluoroalkylene group having 1 to 6 carbon atoms, or a group having 2 to 6 carbon atoms in which an alkylene unit or a fluoroalkylene unit is bonded through an ether bond; and
B represents substituted or unsubstituted alkylene group that may be branched; substituted or unsubstituted fluoroalkylene group that may be branched; or an oxygen atom;

wherein in the formula (2), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time;

wherein in the formula (3), $R_3$ and $R_4$ each independently represent a single bond or substituted or unsubstituted alkylene group having 1 to 5 carbon atoms that may be branched, with the proviso that both $R_3$ and $R_4$ do not represent single bonds at the same time.

Advantageous Effect of Invention

According to the present invention, a lithium secondary battery having excellent cycle characteristics in which the capacity retention ratio is high and the volume change of the cell is small can be provided.

DESCRIPTION OF EMBODIMENTS

[1] Nonaqueous Electrolytic Solution

Figure 1:
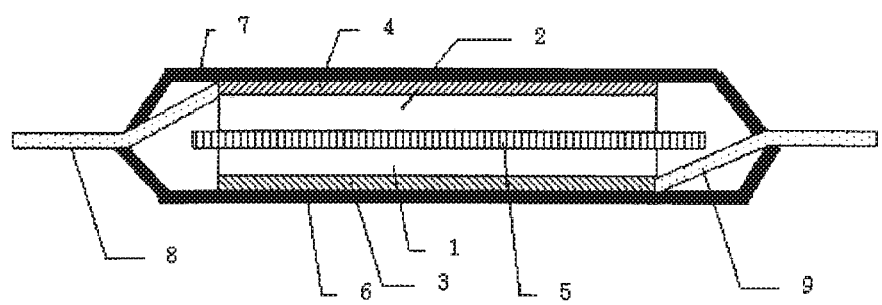
FIG. 1 is a schematic cross-sectional view of a secondary battery according to one embodiment of the present invention.

An electrolytic solution (nonaqueous electrolytic solution) for a secondary battery of the invention of the present application comprises a nonaqueous solvent, a compound represented by the formula (1) (also described as a "compound A"), and at least one compound selected from a compound represented by the formula (2) and a compound represented by the formula (3) ("compound B"), and further, an electrolyte is preferably dissolved in the nonaqueous solvent.

Both a sulfonic acid ester compound and a dicarboxylate ester contained in a nonaqueous electrolytic solution are decomposed by electrochemical oxidation-reduction reactions during charge and discharge reactions to form films on surfaces of electrode active materials, thereby being able to suppress the decomposition of the electrolytic solution and the supporting salt. It is considered that this is effective in achieving a longer life of a lithium ion secondary battery. The present inventors have diligently studied, in more detail, a lithium ion secondary battery comprising a nonaqueous electrolytic solution comprising a sulfonic acid ester compound and a dicarboxylic acid ester. As a result, the present inventors have found that when a nonaqueous electrolytic solution comprising a sulfonic acid ester compound represented by the formula (1) and a dicarboxylic acid ester represented by the formula (2) and/or the formula (3) is used, the characteristics of the lithium ion secondary battery improve remarkably, arriving at the present invention.

(Compound A)

In the present embodiment, the nonaqueous electrolytic solution comprises a sulfonic acid ester compound (compound A) represented by the formula (1) as an additive.

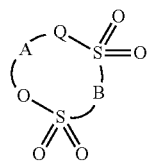

(1)

wherein in the formula (1),
Q represents an oxygen atom, methylene group, or a single bond;
A represents substituted or unsubstituted alkylene group having 1 to 5 carbon atoms, carbonyl group, sulfinyl group, substituted or unsubstituted fluoroalkylene group having 1 to 6 carbon atoms, or a group having 2 to 6 carbon atoms in which an alkylene unit or a fluoroalkylene unit is bonded through an ether bond; and
B represents substituted or unsubstituted alkylene group that may be branched; substituted or unsubstituted fluoroalkylene group that may be branched; or an oxygen atom.

Compound A has a ring structure, and thereby reactivity on the surface of the negative electrode is improved as compared with the sulfonic acid ester having an open-chain structure. Further, compound A has two —$SO_2$—O— structures, and thereby reactivity on the surface of the negative electrode is improved as compared with the monosulfonic acid ester having only one —$SO_2$—O— structure.

In the formula (1), Q represents an oxygen atom, methylene group, or a single bond, and an oxygen atom (—O—) is preferred.

In the formula (1), A represents substituted or unsubstituted alkylene group having 1 to 5 carbon atoms; carbonyl group; sulfinyl group; substituted or unsubstituted fluoroalkylene group having 1 to 6 carbon atoms; or a group having 2 to 6 carbon atoms in which an alkylene unit or a fluoroalkylene unit is bonded through an ether bond. In the formula (1), when A represents alkylene group, it may be either straight or branched, and is preferably straight. In the case of a straight alkylene group, the alkylene group is represented by —$(CH_2)_n$— (n is an integer of 1 to 5), is more preferably a methylene group or an ethylene group represented by —$(CH_2)_n$— (n is 1 or 2), and is furthermore preferably a methylene group. In the branched alkylene group, at least one hydrogen atom of the alkylene group represented by —$(CH_2)_n$— (n is an integer of 1 to 4) is substituted with an alkyl group; examples of the branched alkylene group include —$C(CH_3)_2$—, —$C(CH_3)(CH_2CH_3)$—, —$C(CH_2CH_3)_2$—, —$CH(C_mH_{2m+1})$— (m is an integer of 1 to 4), —$CH_2$—$C(CH_3)_2$—, —$CH_2$—$CH(CH_3)$—, —$CH(CH_3)$—$CH(CH_3)$—, —$CH(CH_3)CH_2CH_2$— or —$CH(CH_3)CH_2CH_2CH_2$—. The fluoroalkylene group means a group in which at least one of the hydrogen atoms in each of the foregoing alkylene groups is substituted with a fluorine atom; all the hydrogen atoms may be substituted with fluorine atoms, and the position and the number of the fluorine substitution are arbitrary. The fluoroalkylene group may either be straight or branched, and preferably straight. When all the hydrogen atoms are substituted with fluorine atoms in the straight fluoroalkylene group, A is represented by —$(CF_2)_n$— (n is an integer of 1 to 5). Specifically, examples of the fluoroalkylene group include monofluoromethylene group, difluoromethylene group, monofluoroethylene group, difluoroethylene group, trifluoroethylene group and tetrafluoroethylene group.

Examples of "a group having 2 to 6 carbon atoms in which an alkylene unit or a fluoroalkylene unit is bonded through an ether bond" in A include —$R^4$—O—$R^5$— ($R^4$ and $R^5$ each independently represent an alkylene group or a fluoroalkylene group, and the total number of carbon atoms of $R^4$ and $R^5$ is 2 to 6), and —$R^6$—O—$R^7$—O—$R^8$— ($R^6$, $R^7$ and $R^8$ each independently represent an alkylene group or a fluoroalkylene group, and the total number of carbon atoms of $R^6$, $R^7$ and $R^8$ is 3 to 6). $R^4$ and $R^5$ may both be alkylene groups or fluoroalkylene groups, or one of $R^4$ and $R^5$ may be an alkylene group and the other may be a fluoroalkylene group. $R^6$, $R^7$ and $R^8$ may each independently be an alkylene group or a fluoroalkylene group. Examples thereof include —$CH_2$—O—$CH_2$—, —$CH_2$—O—$C_2H_4$—, —$C_2H_4$—O—$C_2H_4$—, —$CH_2$—O—$CH_2$—O—$CH_2$—, —$CH_2$—O—CHF—, —$CH_2$—O—$CF_2$—, —$CF_2$—O—$CF_2$—, —$C_2F_4$—O—$C_2F_4$—, —$CF_2$—O—$CF_2$—O—$CF_2$—, —$CH_2$—O—$CF_2$—O—$CH_2$—.

In the formula (1), B represents substituted or unsubstituted alkylene group that may be branched; substituted or unsubstituted fluoroalkylene group that may be branched; or an oxygen atom. As the alkylene group and the fluoroalkylene group, the groups described as the above A may be exemplified. Among these, B is preferably a methylene group (—$CH_2$—) or —$CH(C_mH_{2+1})$— (m is an integer of 1 to 4), more preferably methylene group, ethylidene group [—$CH(CH_3)$—] or —$CH(C_2H_5)$—, further preferably —$CH(CH_3)$— or a methylene group.

The compound A is preferably a six-membered ring or a seven-membered ring, and examples of the compound A include methylene methanedisulfonic acid ester (MMDS) in which, A and B are each methylene group, and Q is an oxygen atom in the formula (1); ethylene methanedisulfonic acid ester (EMDS) in which A is ethylene group, B is methylene group, and Q is an oxygen atom; and (3-methyl-1,5,2,4-dioxadithiane-2,2,4,4,-tetraoxide (3MDT) in which A is methylene group, B is ethylidene group [—$CH(CH_3)$—], and Q is an oxygen atom. One compound A may be used alone, or two or more compounds A may be used in combination.

(Compound B)

In the present embodiment, the nonaqueous electrolytic solution comprises at least one dicarboxylic acid ester represented by the formula (2) or the formula (3) (compound B). It is considered that the compound B has two —C(=O)O— bonds in the molecule and thus has improved affinity for a negative electrode and is easily adsorbed. In addition, it is considered that the compound B has a ring structure and therefore can undergo ring-opening during decomposition and polymerize on a negative electrode, and does not easily come off the surface of the active material even if the expansion and shrinkage of the active material accompanying charge and discharge occurs, and can form a stable film.

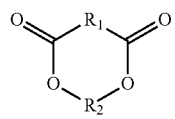
(2)

wherein in the formula (2), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time;

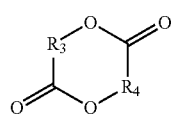
(3)

wherein in the formula (3), $R_3$ and $R_4$ each independently represent a single bond or substituted or unsubstituted alkylene group having 1 to 5 carbon atoms that may be branched, with the proviso that both $R_3$ and $R_4$ do not represent single bonds at the same time.

The compound represented by the formula (2) or the formula (3) is not particularly limited but is preferably a five-membered ring to a seven-membered ring, more preferably a six-membered ring.

Examples of the compound B include Meldrum's acid, 1,4-dioxane-2,3-dione, 1,4-dioxane-2,5-dione, and 3,6-dimethyl-1,4-dioxane-2,5-dione. One of these may be used alone, or two or more of these may be used in combination.

As described above, in the present embodiment, the sulfonic acid ester compound represented by the formula (1) (compound A) and the compound having two —C(=O)O— bonds in the molecule (compound B) are contained in the electrolytic solution as additives. When the compound A and the compound B are used in combination, the compound B can form a polymerized film on a surface of an electrode because it has two —C(=O)O-bonds in the molecule, and can further stabilize the film which is formed from the compound A and prevents the reduction reaction of the electrolytic solution.

In the present embodiment, the content (total content) of the compound represented by the general formula (1) (compound A), and the compound represented by the general formula (2) or the compound represented by the general formula (3) (compound B) in the electrolytic solution is not particularly limited but is preferably 0.1 to 10% by mass, more preferably 0.3 to 8.0% by mass, and further preferably 0.5 to 5.0% by mass. When the content of the compounds in the present embodiment is 0.1% by mass or more, films can be effectively formed on an electrode, and as a result the decomposition of the nonaqueous solvent can be effectively suppressed. In addition, when the content of the compounds in this embodiment is 10% by mass or less, an increase in the internal resistance of a battery due to excessive growth of an SEI film can be effectively suppressed. In addition, the molar ratio of the compound A to the compound B is not particularly limited but is preferably 10:1 to 1:10, more preferably 5:1 to 1:5.

Examples of a supporting salt used as an electrolyte include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$, but the present invention is not limited to these. The supporting salts may be used singly or in combination of two or more types.

The concentration of the supporting salt in the electrolytic solution is preferably 0.5 to 1.5 mol/l. By setting the concentration of the support salt to the range, density, viscosity, electric conductivity and the like can be easily adjusted to the suitable range.

As the nonaqueous solvent, an aprotic solvent is preferred but the present invention is not limited to these. Examples of the nonaqueous solvent include carbonates such as cyclic carbonates and open-chain carbonates, aliphatic carboxylic acid esters, γ-lactones, cyclic ethers, open-chain ethers and fluorinated derivatives of these. These may be used singly or in combination of two or more thereof. Here, in the present specification, the compounds represented by the formula (1), the formula (2) and the formula (3) are distinct from the nonaqueous solvent.

Examples of the cyclic carbonates include propylene carbonate (PC), ethylene carbonate (EC), butylene carbonate (BC) and vinylene carbonate (VC).

Examples of the open-chain carbonates include dimethyl carbonate (DMC), diethyl carbonate (DEC), ethyl methyl carbonate (EMC) and dipropyl carbonate (DPC).

Examples of the aliphatic carboxylic acid esters include methyl formate, methyl acetate and ethyl propionate.

Examples of the γ-lactones include γ-butyrolactone.

Examples of the cyclic ethers include tetrahydrofuran and 2-methyltetrahydrofuran.

Examples of the open-chain ethers include 1,2-diethoxyethane (DEE) and ethoxymethoxyethane (EME).

In addition, the following nonaqueous solvents are exemplified such as dimethyl sulfoxide, 1,3-dioxolane, formamide, acetamide, dimethylformamide, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, N-methylpyrrolidone, fluorinated carboxylic acid ester, methyl-2,2,2-trifluoroethyl carbonate, methyl-2,2,3,3,3-pentafluoropropyl carbonate, trifluoromethyl ethylene carbonate, monofluoromethyl ethylene carbonate, difluoromethyl ethylene carbonate, 4,5-difluoro-1,3-dioxolan-2-one, monofluoroethylene carbonate. These may be used singly or in combinations of two or more thereof.

The nonaqueous solvent preferably comprises carbonates. The carbonates include cyclic carbonates or open-chain carbonates. Advantages of the carbonates are that the relative dielectric constant is large, and therefore the ion dissociation properties of the electrolytic solution improve, and further the viscosity of the electrolytic solution decreases, and therefore the ion mobility improves. But, when the carbonate having a carbonate structure is used as the nonaqueous solvent of the electrolytic solution, the carbonate tends to decompose to generate a gas comprising $CO_2$. Particularly in the case of a stacking laminate type secondary battery, when a gas is produced inside the battery, the problem of blistering emerges significantly, easily leading to performance decrease. Therefore, in the present embodiment, by adding the compounds in this embodiment to the nonaqueous solvent comprising the carbonate, an SEI film formed from the compounds in this embodiment can suppress the decomposition of the carbonate and suppress the generation of a gas. Therefore, in the present embodiment, the electrolytic solution preferably comprises the carbonate as the nonaqueous solvent, in addition to the compounds in this embodiment. By such an arrangement, even if the carbonate is used as the nonaqueous solvent, gas generation can be reduced, and a secondary battery having high performance can be provided. The content of the carbonate in the electrolytic solution is, for example, 30% by volume or more, preferably 50% by volume or more, and more preferably 70% by volume or more.

[2] Negative Electrode

The secondary battery of the present embodiment comprises a negative electrode comprising a negative electrode active material. The negative electrode active material can be bound on the negative electrode current collector by a negative electrode binder.

For example, the negative electrode in the present embodiment can be arranged to have a negative electrode current collector formed of a metal foil, and a negative electrode active material layer applied to one surface or both surfaces of the negative electrode current collector. The negative electrode active material layer is formed so as to cover the negative electrode current collector by a binder for a negative electrode. The negative electrode current collector is arranged to have an extended portion connected to a negative electrode terminal, and the negative electrode active material layer is not applied to this extended portion.

Examples of the negative electrode active material include lithium metal, a metal (a) that can be alloyed with lithium, a metal oxide (b) that can absorb and desorb a lithium ion, and a carbon material (c) that can absorb and desorb a lithium ion, but the present invention is not limited to these. The negative electrode active materials may be used singly or in combination of two or more.

As the metal (a), Al, Si, Pb, Sn, In, Bi, Ag, Ba, Ca, Hg, Pd, Pt, Te, Zn, La, or an alloy containing two or more of these may be exemplified. Alternatively, it may be used by mixing two or more of these metals and alloys. These metals and alloys may comprise one or more non-metal elements. Among these, as the negative electrode active material, it is preferable to use silicon, tin, or alloy thereof. By using silicon or tin as the negative electrode active material, a lithium secondary battery which is excellent in weight energy density and volume energy density can be provided.

Examples of the metal oxide (b) include silicon oxide, aluminum oxide, tin oxide, indium oxide, zinc oxide, lithium oxide, or a composite thereof. Among these, silicon oxide as the negative electrode active material is preferably used. Moreover, the metal oxide (b) may contain one or two or more elements selected from nitrogen, boron and sulfur in amounts of, for example, 0.1 to 5 mass %.

Examples of the carbon material (c) include graphite, amorphous carbon, diamond-like carbon, a carbon nanotube, or a composite thereof.

Examples of the negative electrode binder include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and polyacrylic acid, but the present invention is not limited to these. Among these, polyvinylidene fluoride or styrene-butadiene copolymer rubber is preferable from the view point of high binding force. The content of the negative electrode binder to 100 parts by mass of the negative electrode active material is preferably in the range of 0.5 to 25 parts by mass, and more preferably 1 to 5 parts by mass.

As a negative electrode current collector, in view of electrochemical stability, aluminum, nickel, stainless-steel, chrome, copper, silver, and an alloy thereof are preferable. Examples of its shape include foil, plate-like and mesh-like.

The negative electrode can be produced by forming a negative electrode active material layer comprising the negative electrode active material and the negative electrode binder on the negative electrode current collector. Examples of the method for forming the negative electrode active material layer include a doctor blade method, a die coater method, a CVD method, and a sputtering method. The negative electrode may also be produced by forming the negative electrode active material layer in advance, and then forming a thin film made of aluminum, nickel, or an alloy thereof on the negative electrode active layer by a method such as vapor deposition or sputtering.

[3] Positive Electrode

The secondary battery of the present embodiment comprises a positive electrode comprising a positive electrode active material. The positive electrode active material can be bound on the positive electrode current collector by a positive electrode binder.

For example, the positive electrode in the present embodiment can be arranged to have a positive electrode current collector formed of a metal foil, and a positive electrode active material layer applied to one surface or both surfaces of the positive electrode current collector. The positive electrode active material layer is formed so as to cover the positive electrode current collector by a binder for a positive electrode. The positive electrode current collector is arranged to have an extended portion connected to a positive electrode terminal, and the positive electrode active material layer is not applied to this extended portion.

Although the invention of the present application is not particularly limited, as the positive electrode active material, lithium-containing composite oxides that can absorb and desorb lithium are preferred, and examples of the lithium-containing composite oxides include lithium manganate having a layered structure or lithium manganate having a spinel structure such as $LiMnO_2$ or $Li_xMn_2O_4$ ($0<x<2$), or those in which a part of the Mn of these lithium manganates is replaced by at least one element selected from the group consisting of Li, Mg, Al, Co, B, Ti, and Zn; lithium cobaltate such as $LiCoO_2$, or those in which a part of the Co of lithium cobaltate is replaced by at least one element selected from the group consisting of Ni, Al, Mn, Mg, Zr, Ti, and Zn; lithium nickelate such as $LiNiO_2$, or those in which a part of the Ni of lithium nickelate is replaced by at least one element selected from the group consisting of Co, Al, Mn, Mg, Zr, Ti, and Zn; lithium transition metal oxides in which particular transition metals do not exceed half, such as $LiNi_{1/3}Co_{1/3}Mn_{1/3}O_2$, or those in which a part of the transition metals of the lithium transition metal oxides are replaced by at least one element selected from the group consisting of Co, Al, Mn, Mg, and Zr; and these lithium transition metal oxides in which Li is excessive as compared with the stoichiometric composition. Particularly, as the lithium composite oxides, $Li_\alpha Ni_\beta Co_\gamma Al_\delta O_2$ ($1 \le \alpha \le 1.2$, $\beta+\gamma+\delta=1$, $\beta \ge 0.7$, and $\gamma \le 0.2$), $Li_\alpha Ni_\beta Co_\gamma Mn_\delta O_2$ ($1 \le \alpha \le 1.2$, $\beta+\gamma+\delta=1$, $\beta \ge 0.5$, and $\gamma \le 0.4$), or $Li_\alpha Ni_\beta Co_\gamma Mn_\delta O_2$ ($1 \le \alpha \le 1.2$, $\beta+\gamma+\delta=1$, $\beta \ge 0.7$, and $\gamma \le 0.2$), or those in which a part of the transition metals of these composite oxides are replaced by at least one element selected from the group consisting of Al, Mg, and Zr are preferred. One of these lithium composite oxides may be used alone, or two or more of these lithium composite oxides may be used in combination.

Among them, from the viewpoint of achieving higher energy density, a high capacity compound is preferably contained. Examples of the high capacity compound include lithium acid nickel ($LiNiO_2$), or lithium nickel composite oxides in which a part of the Ni of lithium acid nickel is replaced by another metal element, and layered lithium nickel composite oxides represented by the following formula (A) are preferred.

$$Li_y Ni_{(1-x)} M_x O_2 \tag{A}$$

wherein $0 \le x < 1$, $0 < y \le 1.2$, and M is at least one element selected from the group consisting of Co, Al, Mn, Fe, Ti, and B.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ ($0<\alpha \le 1.2$, preferably $1 \le \alpha \le 1.2$, $\beta+\gamma+\delta=1$, $0.2 \le \beta \le 0.5$, $0.1 \le \gamma \le 0.4$, and $0.1 \le \delta \le 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including these compounds in which the content of each transition metal fluctuates by about 10%).

In addition, from the viewpoint of high capacity, it is preferred that the content of Ni is high, that is, x is less than 0.5, further preferably 0.4 or less in the formula (A).

Examples of such compounds include $Li_\alpha Ni_\beta Co_\gamma Mn_\delta O_2$ ($0 \le \alpha \le 1.2$, preferably $1 \le \alpha \le 1.2$, $\beta+\gamma+\delta=1$, $\beta \ge 0.7$, and $\gamma \le 0.2$) and $Li_\alpha Ni_\beta Co_\gamma Al_\delta O_2$ ($0<\alpha \le 1.2$, preferably $1 \le \alpha \le 1.2$, $\beta+\gamma+\delta=1$, $\beta \ge 0.7$, and $\gamma \le 0.2$) and particularly include $LiNi_\beta Co_\gamma Mn_\delta O_2$ ($0.75 \le \beta \le 0.85$, $0.05 \le \gamma \le 0.15$, and $0.10 \le \delta \le 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

In addition, as the positive electrode active material, active materials that operate at a potential of 4.5 V or more versus lithium (hereinafter also referred to as 5 V class active materials) can be used from the viewpoint that high voltage is obtained.

As the 5 V class active materials, for example, lithium manganese composite oxides represented by the following formula (A) may be used.

$$Li_a(M_x Mn_{2-x-y} Y_y)(O_{4-w} Z_w) \tag{A}$$

wherein in the formula (A), $0.4 \le x \le 1.2$, $0 \le y$, $x+y<2$, $0 \le a \le 1.2$, and $0 \le w \le 1$; M is at least one selected from the group consisting of Co, Ni, Fe, Cr, and Cu; Y is at least one selected from the group consisting of Li, B, Na, Mg, Al, Ti, Si, K, and Ca; and Z is at least one selected from the group consisting of F and Cl.

In addition, as the 5 V class active materials, among such metal composite oxides, spinel type compounds represented by the following formula (B) are preferably used from the viewpoint of obtaining sufficient capacity and achieving longer life.

$$LiNi_x Mn_{2-x-y} A_y O_4 \tag{B}$$

wherein in the formula (B), $0.4<x<0.6$, $0 \le y<0.3$, and A is at least one selected from the group consisting of Li, B, Na, Mg, Al, Ti, and Si.

In the formula (B), $0 \le y<0.2$ is more preferred.

Examples of the spinel type compounds include $Li_x Mn_{1.5} Ni_{0.5} O_4$ ($0<x<2$).

In addition, examples of the active materials that operate at a potential of 4.5 V or more versus lithium include Si composite oxides. Examples of such Si composite oxides include compounds represented by the following formula (C):

$$Li_2 MSiO_4 \tag{C}$$

wherein in the formula (C), M is at least one selected from the group consisting of Mn, Fe, and Co.

In addition, the active materials that operate at a potential of 4.5 V or more versus lithium may comprise layered structures. Examples of the 5 V class active materials comprising layered structures include compounds represented by the following formula (D):

$$Li(M1_x M2_y Mn_{1-x-y})O_2 \tag{D}$$

wherein in the formula (D), M1 is at least one selected from the group consisting of Ni, Co, and Fe; and M2 is at least one selected from the group consisting of Li, Mg, and Al, $0.1<x<0.5$, and $0.05<y<0.3$.

As the 5 V class active materials, lithium metal composite oxides represented by the following (E) to (G) may be used.

$$LiMPO_4 \quad (E)$$

wherein in the formula (E), M is at least one selected from the group consisting of Co and Ni.

Examples of the olivine type 5 V active materials represented by the formula (E) include $LiCoPO_4$ or $LiNiPO_4$.

$$Li(M_yMn_z)O_2 \quad (F)$$

wherein in the formula (F), $0.1 \leq y \leq 0.67$, preferably $y \leq 0.5$, $0.33 \leq z \leq 0.9$, preferably $z \leq 0.7$, $y+z=1$, and M is at least one selected from the group consisting of Li, Co, and Ni.

$$Li(Li_xM_yMn_z)O_2 \quad (G)$$

wherein in the formula (G), $0.1 \leq x < 0.3$, $0.1 \leq y \leq 0.4$, $0.33 \leq z \leq 0.7$, $x+y+z=1$, and M is at least one selected from the group consisting of Li, Co, and Ni.

All the above-described positive electrode active materials may be used alone or in combinations of two or more.

As the positive electrode binder, the same materials as mentioned for the negative electrode binder can be used. Among them, polyvinylidene fluoride is preferred from the viewpoint of versatility and low cost. The amount of the positive electrode binder is preferably 2 to 10 parts by mass based on 100 parts by mass of the positive electrode active material.

As the positive electrode current collector, the same materials as mentioned for the negative electrode current collector may be used.

A conductive auxiliary material may be added to the positive electrode active material layer comprising the positive electrode active material for the purpose of decreasing impedance. Examples of the conductive auxiliary material include carbonaceous fine particles such as graphite, carbon black, and acetylene black.

[4] Separator

As the separator, a porous film or non-woven fabric made of polypropylene, polyethylene, or the like may be used, but the present invention is not particularly limited to these. In addition, the separator in which they are laminated may be used.

[5] Package

The package is not particularly limited but, for example, a laminate film may be used. For example, in the case of a stacked laminate type secondary battery, a laminate film made of polypropylene, polyethylene, or the like, coated with aluminum or silica, may be used.

In the case of a secondary battery using a laminate film as a package, when a gas is generated, the strain of the electrode stack is very large compared with a secondary battery using a metal can as a package. This is because the laminate film deforms easily by the internal pressure of the secondary battery compared with the metal can. Further, when the secondary battery using the laminate film as the package is sealed, usually, the battery internal pressure is set lower than atmospheric pressure, and therefore there is no extra space inside, and when a gas is generated, it easily immediately leads to the volume change of the battery and the deformation of the electrode stack. The secondary battery according to the present embodiment can overcome such problems, however, by using the electrolytic solution comprising the compounds in the present embodiment.

[6] Secondary Battery

Figure 2:
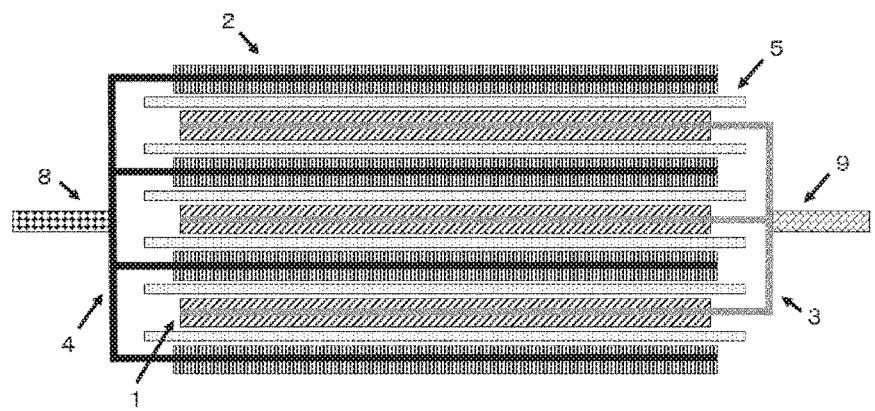
FIG. 2 is a schematic cross-sectional view showing the structure of the electrode stack of a stacking laminate type secondary battery.

A secondary battery using the nonaqueous electrolytic solution in the present embodiment has, for example, a structure as shown in FIG. 1. In the positive electrode, a layer 1 containing a positive electrode active material is formed on a positive electrode current collector 3, and in the negative electrode, a layer 2 containing a negative electrode active material is formed on a negative electrode current collector 4. These positive electrode and negative electrode are disposed so as to face each other with a porous separator 5 between them. The porous separator 5 is disposed generally parallel to the layer 2 containing the negative electrode active material. In the secondary battery, an electrode element (also described as a "battery element") in which these positive electrode and negative electrode are disposed so as to face each other and the electrolytic solution are contained in packages 6 and 7. A positive electrode tab 9 is connected to the positive electrode current collector 3, and a negative electrode tab 8 is connected to the negative electrode current collector 4, and these tabs are drawn out of the container. As shown in FIG. 2, the electrode element may have an arrangement in which a plurality of positive electrodes and a plurality of negative electrodes are stacked via separators. In addition, the positive electrode active material layer 1 and the negative electrode active material layer 2 may be provided on both surfaces of the current collectors respectively. The shape of the nonaqueous electrolytic solution secondary battery according to the present embodiment is not particularly limited, but examples of the shape include a laminate packaging type, a cylindrical type, a prismatic type, and a coin type.

Figure 3:
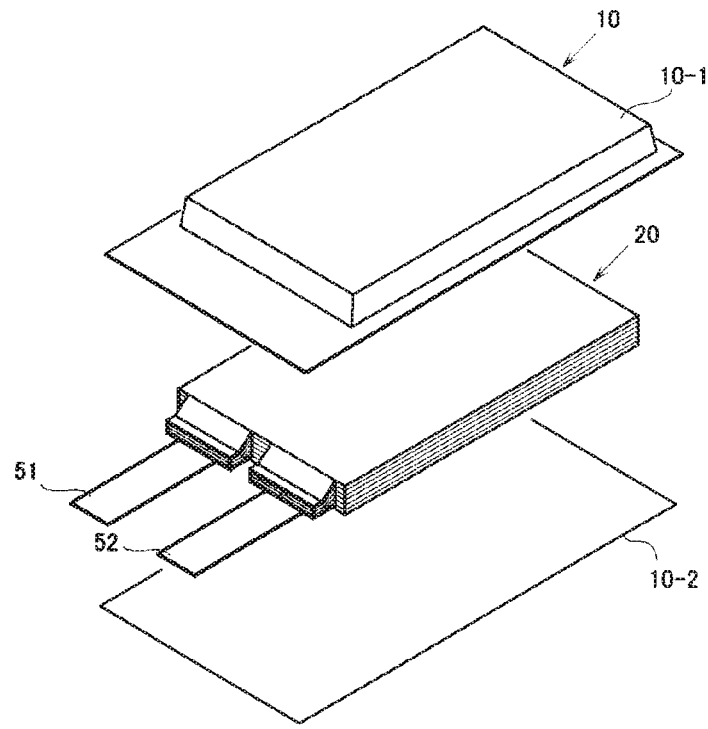
FIG. 3 is an exploded perspective view showing the basic structure of a film-packaged battery.
Figure 4:
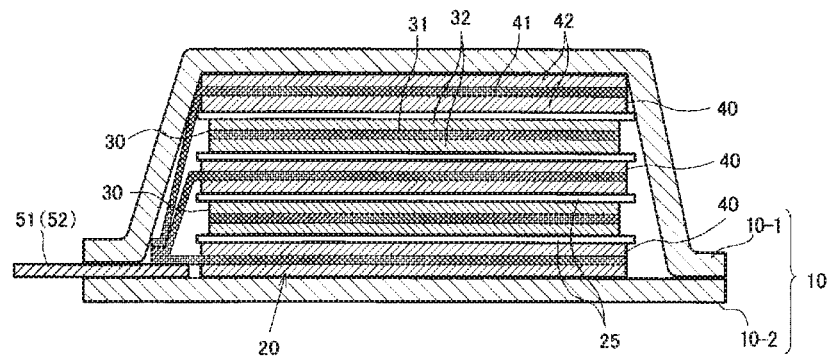
FIG. 4 is a cross-sectional view schematically showing a cross section of the battery in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

EXAMPLES

Hereinafter, the present embodiment will be described in more detail by means of Examples, but the present invention is not limited to these.

Here, abbreviations used in the examples are as follows.
EC: ethylene carbonate
DEC: diethyl carbonate
MMDS: methylene methanedisulfonic acid ester
3MDT: 3-methyl-1,5,2,4-dioxadithiane-2,2,4,4,-tetraoxide
MA: Meldrum's acid
DD: 1,4-dioxane-2,5-dione
DDD: 3,6-dimethyl-1,4-dioxane-2,5-dione
SA: succinic anhydride
γ-BL: γ-butyrolactone Example 1

Fabrication of Electrodes

<Negative Electrode>

As a negative electrode active material, graphite was used. This negative electrode active material, acetylene black as a conductive auxiliary material, and polyvinylidene fluoride as a negative electrode binder were measured at a mass ratio of 75:20:5. Then, these were mixed with N-methylpyrrolidone to prepare a negative electrode slurry. The negative electrode slurry was applied to a copper foil having a thickness of 10 μm followed by drying and further heat treatment at 120° C. under a nitrogen atmosphere to fabricate a negative electrode.

<Positive Electrode>

As a positive electrode active material, Li(Ni$_{0.5}$Co$_{0.2}$Mn$_{0.3}$)O$_2$ was used. This positive electrode active material, carbon black as a conductive auxiliary material, and polyvinylidene fluoride as a positive electrode binder were measured at a mass ratio of 90:5:5. Then, these were mixed with N-methylpyrrolidone to prepare a positive electrode slurry. The positive electrode slurry was applied to an aluminum foil having a thickness of 20 μm followed by drying and further pressing to fabricate a positive electrode.

<Electrode Stack>

Three layers of the obtained positive electrodes and four layers of the negative electrodes were alternately superposed with polypropylene porous films as separators sandwiched therebetween. The ends of the positive electrode current collectors not covered with the positive electrode active material were welded, and the ends of the negative electrode current collectors not covered with the negative electrode active material were welded. Further, a positive electrode terminal made of aluminum and a negative electrode terminal made of nickel were welded to the welded parts respectively to obtain an electrode stack having a planar stacked structure.

<Electrolytic Solution>

A mixed solvent of ethylene carbonate (EC) and diethyl carbonate (DEC) (volume ratio: EC/DEC=30/70) was used as the solvent of a nonaqueous electrolytic solution, and LiPF$_6$ as a supporting electrolyte was dissolved at 1 M in the nonaqueous electrolytic solution.

Methylene methanedisulfonic acid ester (MMDS) represented by the formula (1) in which A and B are each methylene group, and Q is an oxygen atom, and Meldrum's acid (MA) represented by the formula (2) in which R$_1$ is methylene group and R$_2$ is dimethylmethylene group [—C(CH$_3$)$_2$—)], as additives, were added in amounts of 1.6% by weight and 1.0% by weight respectively in the nonaqueous electrolytic solution to prepare the nonaqueous electrolytic solution. A nonaqueous secondary battery was fabricated using this nonaqueous electrolytic solution, and a charge and discharge cycle test was performed for 200 cycles.

<Secondary Battery>

The electrode stack was housed in an aluminum laminate film as a package, and the electrolytic solution was injected into the package. Then, while the pressure was reduced to 0.1 atmospheres, the package was sealed to fabricate a secondary battery.

<Evaluation>

(Capacity Retention Ratio and Volume Increase Ratio at 45° C.)

The fabricated secondary battery was subjected to a test in which charge and discharge was repeated 200 times in the voltage range of 2.5 V to 4.2 V in a thermostat kept at 45° C., and evaluated for the cycle retention ratio (capacity retention ratio) (%) and the volume increase ratio (%). In the charge, the secondary battery was charged at 1 C to 4.2 V and then subjected to constant voltage charge for 2.5 hours in total. In the discharge, the secondary battery was subjected to constant current discharge at 1 C to 2.5 V.

The "capacity retention ratio (%)" was calculated by (discharge capacity after 200 cycles)/(discharge capacity after 1 cycle)×100 (unit: %).

The method for measuring the "volume increase ratio (%)" is as follows. After the fabrication of the lithium secondary battery, the volume (initial volume) was measured before charge and discharge. The measurement of the volume was performed by the Archimedes method. At the point when the above charge and discharge 200 cycles of charge and discharge was performed, the volume of the lithium secondary battery was measured by the same method as the measurement before the charge and discharge, and the volume increase ratio was calculated according to the following formula:

volume increase ratio (%)=100×(volume after 200 cycles of charge and discharge−initial volume)/initial volume The results are shown in Table 1.

Example 2

A secondary battery was fabricated and evaluated as in Example 1 except that as an additive used in the nonaqueous electrolytic solution, a cyclic disulfonic acid ester (3-methyl-1,5,2,4-dioxadithiane-2,2,4,4,-tetraoxide (3MDT)) represented by the formula (1) in which A is methylene group, B is ethylidene group [—CH(CH$_3$)—], and Q is an oxygen atom was used instead of (MMDS). The results are shown in Table 1.

Example 3

A secondary battery was fabricated and evaluated as in Example 1 except that as an additive used in the nonaqueous electrolytic solution, 1,4-dioxane-2,5-dione (DD) was used instead of Meldrum's acid. The results are shown in Table 1.

Example 4

A secondary battery was fabricated and evaluated as in Example 1 except that as an additive used in the nonaqueous electrolytic solution, 3,6-dimethyl-1,4-dioxane-2,5-dione (DDD) was used instead of Meldrum's acid. The results are shown in Table 1.

Comparative Example 1

A mixed solvent of EC and DEC (volume ratio: 30/70) was used as the solvent of a nonaqueous electrolytic solution, $LiPF_6$ as a supporting electrolyte was dissolved without adding additives, and a secondary battery was fabricated and a charge and discharge cycle test was performed for 200 cycles as in Example 1. The results are shown in Table 1.

Comparative Example 2

A secondary battery was fabricated and a charge and discharge cycle test was performed for 200 cycles as in Example 1 except that as the additive used in the nonaqueous electrolytic solution, Meldrum's acid was not added, and MMDS was added in an amount of 2.6% by weight in the electrolytic solution. The results are shown in Table 1.

Comparative Example 3

A secondary battery was fabricated and a charge and discharge cycle test was performed for 200 cycles as in Example 1 except that as the additive used in the nonaqueous electrolytic solution, MMDS was not added, and Meldrum's acid was added in an amount of 2.6% by weight in the electrolytic solution. The results are shown in Table 1.

Comparative Example 4

A secondary battery was fabricated and a charge and discharge cycle test was performed for 200 cycles as in Example 1 except that as the additive used in the nonaqueous electrolytic solution, MMDS was not added, and 1,4-dioxane-2,5-dione was added in an amount of 2.6% by weight in the electrolytic solution. The results are shown in Table 1.

Comparative Example 5

A secondary battery was fabricated and a charge and discharge cycle test was performed for 200 cycles as in Example 1 except that as the additive used in the nonaqueous electrolytic solution, MMDS was not added, and 3,6-dimethyl-1,4-dioxane-2,5-dione was added in an amount of 2.6% by weight in the electrolytic solution. The results are shown in Table 1.

Comparative Example 6

A secondary battery was fabricated and evaluated as in Example 1 except that as an additive used in the nonaqueous electrolytic solution, succinic anhydride (SA) was used instead of Meldrum's acid. The results are shown in Table 1.

Comparative Example 7

A secondary battery was fabricated and evaluated as in Example 1 except that as an additive used in the nonaqueous electrolytic solution, γ-butyrolactone (γ-BL) was used instead of Meldrum's acid. The results are shown in Table 1.

TABLE 1

|  | Compound A | Compound B | Compound C | Compound A (wt %) | Compound B (wt %) | Compound C (wt %) | capacity retention ratio (%) @200 cycles | volume change ratio (%) @200 cycles |
|---|---|---|---|---|---|---|---|---|
| Ex. 1 | MMDS | MA | — | 1.6 | 1 | 0 | 90.1 | 1.5 |
| Ex. 2 | 3MDT | MA | — | 1.6 | 1 | 0 | 89.1 | 1.2 |
| Ex. 3 | MMDS | DD | — | 1.6 | 1 | 0 | 89.5 | 1.6 |
| Ex. 4 | MMDS | DDD | — | 1.6 | 1 | 0 | 89.0 | 1.7 |
| Comp-Ex. 1 | — | — | — | 0 | 0 | 0 | 75.0 | 10.5 |
| Comp-Ex. 2 | MMDS | — | — | 2.6 | 0 | 0 | 87.6 | 5.0 |
| Comp-Ex. 3 | — | MA | — | 0 | 2.6 | 0 | 79.5 | 3.7 |
| Comp-Ex. 4 | — | DD | — | 0 | 2.6 | 0 | 76.5 | 2.5 |
| Comp-Ex. 5 | — | DDD | — | 0 | 2.6 | 0 | 76.7 | 2.6 |
| Comp-Ex. 6 | MMDS | — | SA | 1.6 | 0 | 1 | 74.8 | 3.2 |
| Comp-Ex. 7 | MMDS | — | γ-BL | 1.6 | 0 | 1 | 73.2 | 3.3 |

Ex.: Example
Comp-Ex.: Comparative Example (Evaluation Results of Cycle Test)

As described above, a lithium secondary battery comprising a nonaqueous electrolytic solution obtained by adding $LiPF_6$ as a supporting electrolyte at 1 mol/L to a mixed solvent of EC and DEC (volume ratio: 30/70) as the solvent of the nonaqueous electrolytic solution and further adding the compound A and the compound B as additives at a mixing ratio as shown in Table 1 was fabricated, and the cycle test was performed using this (Examples 1 to 4). As objects to be compared, also for a case where only the compound A was used in the nonaqueous electrolytic solution (Comparative Example 2), a case where only the compound B was used (Comparative Examples 3 to 5), a case where the compound A and a carboxylic acid anhydride or a cyclic monocarboxylic acid ester (compound C) were mixed at a mixing ratio shown in Table 1 (Comparative Examples 6 to 7), and further a case where none of the additives were added (Comparative Example 1), the cycle tests were performed at the same time.

From the results of Examples 1 to 4, it was shown that when both the compound A and the compound B were added to the nonaqueous electrolytic solution, a good capacity retention ratio was shown, the volume increase ratio (volume change ratio) was low, and the amount of gas generated was able to be suppressed. Particularly in Example 1 and Example 2, the capacity retention ratio was high, and the volume increase ratio was able to be effectively suppressed.

In addition, when Comparative Example 1 is compared with Comparative Examples 2 to 5, it is found that compared with Comparative Example 1 in which neither the compound A nor the compound B is added, Comparative Examples 2 to 5 comprising either the compound A or the compound B alone have a larger effect of improving cycle life and suppressing volume increase than Comparative Example 1. In Comparative Example 2, the concentration of the compound A is high and a relatively good capacity retention ratio is shown, but the volume change ratio is large compared with Examples 1 to 4, and further another problem is that when a large amount of MMDS is used, the cost increases.

In addition, in Comparative Examples 6 and 7, the result was that when the compound A and the compound C were added, the cycle characteristics were lower than those when the compound A was used alone, and it became clear that the effect of improving cycle characteristics was not obtained by the combination of the compound A and the compound C. The compound used as the compound C is succinic anhydride or γ-BL, and both are compounds having one ester bond. From this, it was found that when the carboxylic acid ester used as the additive used in combination with the compound A had two or more ester bonds, remarkable effects of the invention of the present application were obtained.

INDUSTRIAL APPLICABILITY

The present embodiment can be utilized in various industrial fields that require for a power supply and in an industrial field concerning transportation, storage and supply of electric energy. Specifically, it can be utilized for, for example, a power supply of a mobile device such as a mobile phone and a notebook computer; a power supply of a moving or transport medium such as a train, a satellite and a submarine, including an electric vehicle such as an electric car, a hybrid car, an electric motorcycle, and an electric power-assisted bicycle; a back-up power supply such as UPS; and a power storage device for storing an electric power generated by solar power generation, wind power generation, and the like.

EXPLANATION OF REFERENCE 1 positive electrode active material layer
2 negative electrode active material layer
3 positive electrode current collector
4 negative electrode current collector
5 porous separator
6 laminate package
7 laminate package
8 negative electrode tab
9 positive electrode tab
10 film package
20 battery element
25 separator
30 positive electrode
40 negative electrode

The invention claimed is:

1. An electrolytic solution for a secondary battery comprising:
    a nonaqueous solvent,
    a compound represented by the following formula (1), and
    at least one compound selected from the group consisting of a compound represented by the following formula (2), 1,4-dioxane-2,5-dione and 3,6-dimethyl-1,4-dioxane-2,5-dione,

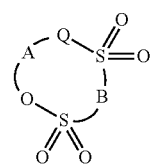

(1)

wherein in the formula (1),
    Q represents an oxygen atom, methylene group, or a single bond;
    A represents substituted or unsubstituted alkylene group having 1 to 5 carbon atoms, carbonyl group, sulfinyl group, substituted or unsubstituted fluoroalkylene group having 1 to 6 carbon atoms, or a group having 2 to 6 carbon atoms in which an alkylene unit or a fluoroalkylene unit is bonded through an ether bond; and
    B represents substituted or unsubstituted alkylene group that may be branched, substituted or unsubstituted fluoroalkylene group that may be branched, or an oxygen atom;

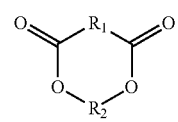

(2)

wherein in the formula (2), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time.

2. The electrolytic solution for a secondary battery according to claim 1, comprising a lithium salt as an electrolyte.

3. The electrolytic solution for a secondary battery according to claim 2, wherein the lithium salt is at least one lithium salt selected from the group consisting of $LiPF_6$, $LiBF_4$, $LiAsF_6$, $LiSbF_6$, $LiClO_4$, $LiAlCl_4$ and $LiN(C_kF_{2k+1}SO_2)(C_mF_{2m+1}SO_2)$ (k and m are each independently 1 or 2).

4. The electrolytic solution for a secondary battery according to claim 1, wherein the nonaqueous solvent is at least one organic solvent selected from the group consisting of cyclic carbonates, open-chain carbonates, aliphatic carboxylic acid esters, γ-lactones, cyclic ethers, open-chain ethers and the fluorine derivatives of these compounds.

5. A secondary battery comprising a positive electrode, a negative electrode and the electrolytic solution for a secondary battery according to claim 1.

6. The secondary battery according to claim 5, wherein the positive electrode comprises lithium-containing composite oxide capable of absorbing and desorbing lithium as a positive electrode active material.

7. The secondary battery according to claim 5, wherein the negative electrode comprises carbon as a negative electrode active material.

8. A method for producing an electrolytic solution for a secondary battery, comprising dissolving in a nonaqueous solvent,
   a compound represented by the following formula (1), and
   at least one compound selected from the group consisting of a compound represented by the following formula (2), 1,4-dioxane-2,5-dione and 3,6-dimethyl-1,4-dioxane-2,5-dione,

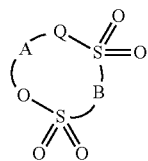 (1)

wherein in the formula (1),
Q represents an oxygen atom, methylene group, or a single bond;
A represents substituted or unsubstituted alkylene group having 1 to 5 carbon atoms, carbonyl group, sulfinyl group, substituted or unsubstituted fluoroalkylene group having 1 to 6 carbon atoms, or a group having 2 to 6 carbon atoms in which an alkylene unit or a fluoroalkylene unit is bonded through an ether bond; and
B represents substituted or unsubstituted alkylene group that may be branched, substituted or unsubstituted fluoroalkylene group that may be branched, or an oxygen atom;

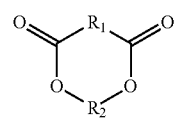 (2)

wherein in the formula (2), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time.

9. The electrolytic solution for a secondary battery according to claim 1, wherein the compound represented by the formula (2) is Meldrum's acid.

10. The electrolytic solution for a secondary battery according to claim 1, wherein the compound represented by the formula (1) is at least one compound selected from the group consisting of methylene methanedisulfonic acid ester and 3-methyl-1,5,2,4-dioxadithiane-2,2,4,4-tetraoxide.

11. The electrolytic solution for a secondary battery according to claim 1, comprising Meldrum's acid.

12. The electrolytic solution for a secondary battery according to claim 1, comprising 1,4-dioxane-2,5-dione.

13. The electrolytic solution for a secondary battery according to claim 1, comprising 3,6-dimethyl-1,4-dioxane-2,5-dione.

14. The electrolytic solution for a secondary battery according to claim 1, wherein
   the compound represented by the formula (1) is at least one compound selected from the group consisting of methylene methanedisulfonic acid ester and 3-methyl-1,5,2,4-dioxadithiane-2,2,4,4-tetraoxide, and
   the compound represented by the formula (2) is Meldrum's acid.

* * * * *